United States Patent
Covey et al.

(10) Patent No.: US 12,531,224 B2
(45) Date of Patent: Jan. 20, 2026

(54) HIGH FLOWRATE FLUSHING FOR OPEN PORT SAMPLING PROBE

(71) Applicant: DH TECHNOLOGIES DEVELOPMENT PTE. LTD., Singapore (SG)

(72) Inventors: Thomas R. Covey, Concord (CA); Chang Liu, Concord (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 536 days.

(21) Appl. No.: 17/999,614

(22) PCT Filed: May 20, 2021

(86) PCT No.: PCT/IB2021/054398
§ 371 (c)(1),
(2) Date: Nov. 22, 2022

(87) PCT Pub. No.: WO2021/234641
PCT Pub. Date: Nov. 25, 2021

(65) Prior Publication Data
US 2023/0197428 A1    Jun. 22, 2023

Related U.S. Application Data

(60) Provisional application No. 63/029,049, filed on May 22, 2020.

(51) Int. Cl.
*H01J 49/04* (2006.01)
*H01J 49/24* (2006.01)

(52) U.S. Cl.
CPC ........ *H01J 49/0404* (2013.01); *H01J 49/044* (2013.01); *H01J 49/24* (2013.01)

(58) Field of Classification Search
CPC ....... H01J 49/0404; H01J 49/044; H01J 49/24
See application file for complete search history.

(56) References Cited

U.S. PATENT DOCUMENTS

| | | | |
|---|---|---|---|
| 4,213,342 A * | 7/1980 | Gates | G01N 1/14 73/863.81 |
| 5,208,458 A | 5/1993 | Busch | |

(Continued)

FOREIGN PATENT DOCUMENTS

| | | |
|---|---|---|
| GB | 2520389 | 5/2015 |
| KR | 20160099376 A | 8/2016 |

(Continued)

OTHER PUBLICATIONS

PCT International Search Report and Written Opinion in International Application PCT/IB2021/054398, mailed Aug. 9, 2021, 17 pages.

(Continued)

*Primary Examiner* — Tarun Sinha
(74) *Attorney, Agent, or Firm* — Merchant & Gould P.C.

(57) ABSTRACT

In a sampling system for mass spectrometry, a method and apparatus are set forth for high flow-rate flushing and sample delivery via a sampling probe (10). The sampling system includes a sampling probe (10) having a first fluid conduit (40) with an inlet, a second fluid conduit (42) with an outlet, and a sampling port fluidly connecting the first fluid conduit (40) and second fluid conduit (42). A fluid source (50) is attached to the inlet and a vacuum source (60) is attached to the outlet for causing fluid to flow through the first fluid conduit (40) past the sampling port and exit through the second fluid conduit (42). A cap (90) is provided for selectively closing and opening the sampling port. When the cap is removed, thus when the sampling port is open, sample may be introduced into, and captured by fluid flowing through the sampling port. When the cap is in place, thus (Continued)

when the sampling port is closed, a flushing fluid is supplied for flushing the sampling probe (10).

20 Claims, 6 Drawing Sheets

(56) References Cited

U.S. PATENT DOCUMENTS

| | | | |
|---|---|---|---|
| 5,691,205 | A | 11/1997 | Kawabata et al. |
| 6,235,471 | B1 | 5/2001 | Knapp |
| 7,070,260 | B2 | 7/2006 | Mutz et al. |
| 7,923,681 | B2 | 4/2011 | Collings et al. |
| 8,147,665 | B2 | 4/2012 | Livache et al. |
| 8,637,813 | B2 | 1/2014 | Van Berkel |
| 8,741,149 | B2 | 6/2014 | Hughes |
| 9,779,926 | B2 | 10/2017 | Van Berkel |
| 10,115,577 | B1 | 10/2018 | Eiler |
| 10,151,727 | B2 | 12/2018 | Kawabata et al. |
| 10,770,277 | B2 | 9/2020 | Datwani et al. |
| 10,998,179 | B2 | 5/2021 | Arnold et al. |
| 11,476,106 | B2 | 10/2022 | Arnold et al. |
| 11,817,302 | B2 | 11/2023 | Arnold et al. |
| 2001/0049148 | A1 | 12/2001 | Wolk |
| 2002/0150926 | A1 | 10/2002 | Jindal |
| 2003/0193020 | A1* | 10/2003 | Van Berkel ......... H01J 49/0463 250/288 |
| 2006/0169030 | A1 | 8/2006 | Stewart |
| 2009/0166525 | A1 | 7/2009 | Hughes |
| 2009/0193880 | A1* | 8/2009 | Halverson ............... B01F 31/20 422/400 |
| 2009/0309020 | A1 | 12/2009 | Cooks |
| 2010/0224013 | A1 | 9/2010 | Van Berkel |
| 2010/0237235 | A1 | 9/2010 | Ozbal |
| 2011/0133077 | A1 | 6/2011 | Henion |
| 2011/0220784 | A1 | 9/2011 | Roach |
| 2012/0053065 | A1 | 3/2012 | Van Berkel |
| 2012/0079894 | A1* | 4/2012 | Van Berkel ........... H01J 49/165 73/863.11 |
| 2013/0043380 | A1 | 2/2013 | Correale |
| 2013/0048851 | A1 | 2/2013 | Kumano |
| 2013/0294971 | A1 | 11/2013 | Van Berkel et al. |
| 2014/0117221 | A1 | 5/2014 | Schneider |
| 2014/0216177 | A1 | 8/2014 | Van Berkel et al. |
| 2014/0312219 | A1 | 10/2014 | Ardelt |
| 2014/0326872 | A1 | 11/2014 | Van Berkel |
| 2016/0049065 | A1 | 2/2016 | Lu et al. |
| 2018/0158661 | A1 | 6/2018 | Eberlin |
| 2018/0269047 | A1 | 9/2018 | Zhu |
| 2019/0049415 | A1 | 2/2019 | Pawlisszyn |
| 2019/0157061 | A1* | 5/2019 | Datwani ............. H01J 49/0031 |
| 2020/0043712 | A1 | 2/2020 | Arnold et al. |
| 2022/0341838 | A1 | 10/2022 | Ghazi |
| 2023/0207297 | A1 | 6/2023 | Ang |

FOREIGN PATENT DOCUMENTS

| | | |
|---|---|---|
| WO | 00/25923 | 5/2000 |
| WO | 2015/019159 | 2/2015 |
| WO | 2015/040391 | 3/2015 |
| WO | 2015/188282 | 12/2015 |
| WO | 2021/035244 | 2/2021 |
| WO | 2021/234674 | 11/2021 |

OTHER PUBLICATIONS

Li, Anyin et al., "Robotic Surface Analysis Mass Spectometry (RoSA-MS) of Three-Dimensional Objects", Analytical Chemistry, vol. 90, No. 6, Mar. 1, 2018, pp. 3981-3986.

PCT International Preliminary Report on Patentability in International Application PCT/IB2021/054398, mailed Dec. 1, 2022, 13 pages.

Van Berkel et al., "An open port sampling interface for liquid introduction atmospheric pressure ionization mass spectometry", Rapid Communications in Mass Spectrometry, 29(19), pp. 1749-1756 (2015).

Hager et al., "Product Ion Scanning Using a Q-q-Q Linear Ion Trap (Q TRAP) Mass Spectrometer", Rapid Communications in Mass Spectrometry, 2003; 17, 1056-1064.

Kommireddy, et al., "Layer-by-Layer Assembly of TiO2 Nanoparticles for Stable Hydrophilic Biocompatible Coatings", Journal of Nanoscience and Nanotechnology, American Sci Pub., US, vol. 5, No. 7, Jul. 1, 2005, pp. 1081-1087.

Liu, Chang et al., "Fluid Dynamics of the Open Port Interface for High-Speed nanoliter vol. Sampling Mass Spectrometry", Analytical Chemistry, vol. 93, No. 24, Jun. 10, 2021, pp. 8559-8567.

Tsougeni, K. et al., "Mechanisms of oxygen plasma nanotexturing of organic polymer surfaces; From stable super hydrophilic to super hydrophobic surfaces", Langmuir, American Chemical Society, US, vol. 25, No. 19, Oct. 6, 2009, pp. 11748-11759.

Zhang Hui et al., "Acoustic Ejection Mass Spectometry for Hugh-Throughput Analysis", bioRxiv, Jan. 29, 2020, 32 pages.

Vas, Gyorgy et al., "Solid-phase microextraction: a powerful sample preparation tool prior to mass spectrometric analysis", Journal of Mass Spectrometry, vol. 39, No. 3, Mar. 2, 2004, pp. 233-254.

* cited by examiner

HIGH FLOWRATE FLUSHING FOR OPEN PORT SAMPLING PROBE

CROSS-REFERENCE TO RELATED CASES

This application is a National Stage Application of PCT International Patent Application No. PCT/IB2021/054398, filed May 20, 2021, which claims the benefit of priority from to U.S. provisional application 63/029,049, filed on May 22, 2020, the contents of which are incorporated herein by reference in their entireties. To the extent appropriate, a claim of priority is made to each of the above disclosed applications.

FIELD

The present specification relates to sampling interfaces for mass spectrometry systems, and more particularly to a method and apparatus for high flow-rate flushing and sample delivery via a sampling probe.

BACKGROUND

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of the analyte of interest. Such pre-analytical steps can include sampling (i.e., sample collection) and sample preparation (separation from the matrix, concentration, fractionation and, if necessary, derivatization). It has been estimated, for example, that more than 80% of the time of overall analytical process can be spent on sample collection and preparation in order to enable the analyte's detection via MS or to remove potential sources of interference contained within the sample matrix, while nonetheless increasing potential sources of dilution and/or error at each sample preparation stage.

Ideally, sample preparation and sample introduction techniques for MS should be fast, reliable, reproducible, inexpensive, and in some aspects, amenable to automation. By way of example, various ionization methods have been developed that can desorb/ionize analytes from condensed-phase samples with minimal sample handling. One example of an improved sample introduction technique is a sampling probe, such as an "open port" sampling interface (OPI) in which relatively unprocessed samples can be introduced into a continuous flowing solvent that is delivered to an ion source of a MS system, as described for example in an article entitled "An open port sampling interface for liquid introduction atmospheric pressure ionization mass spectrometry" of Van Berkel et al., published in *Rapid Communications in Mass Spectrometry*, 29(19), pp. 1749-1756 (2015), which is incorporated by reference in its entirety.

The flow of samples from an OPI to a destination, such as an MS system, results from a Venturi-effect created at an aspiration port by a nebulizer gas flowing in the OPI, which draws sample solution from the open region for electrospray to an ion source of the MS system. The sample flow-rate is dependent on the nebulizer gas flow (gas pressure, nozzle size), the position of the ESI (electrospray ionization) electrode tip relative to ESI nozzle, and the flow resistance within the transfer conduit between the OPI and MS system (fluid viscosity, tubing length/ID, etc.).

Problems in the flow of samples can occur as a result of changes in the flow resistance, especially in the case of long transfer conduits between the OPI and MS system and/or use of a more viscous solvent (e.g. water). Such problems can reduce analytical performance resulting from longer delays in sample delivery with significant peak broadening. Also, incorrect alignment of the OPI with the sample source can result in cross-contamination resulting from the introduction of solids or dust to the sample flow. Additionally, long transfer conduits can be susceptible to the creation and entrapment of air bubbles in the transfer conduit.

Previous approaches to the foregoing problems include the use of an additional aspiration pump close to the ion source, and use of a spring-loaded needle probe structure (see Fernandez et. Al., Anal. Chem. 2018, 90, 3981-3986), wherein the proposed needle probe comprises the actual "sample".

SUMMARY

It is an aspect of the present specification to provide a method and apparatus for high flow-rate flushing and sample delivery from a sampling probe over a long transfer fluid conduit or/and when a highly viscous solvent is used. It is an aspect of the present specification to provide a method and apparatus for high flow-rate flushing of a sample probe for a variety of reasons including, for instance, cleaning the capture probe and/or the transfer lines, removing air bubbles or clogs in the transfer lines, and switching between capture fluid compositions.

In some embodiments, a sampling system is provided. The system comprising: a sampling probe including a first fluid conduit having an inlet, the first fluid conduit in fluid communication with a second fluid conduit having an outlet, and a sampling port for receiving and capturing sample fluidly connecting the first fluid conduit and the second fluid conduit; a fluid source for supplying capture fluid attached to the inlet; and, a cap for selectively closing and opening the sampling port. In some aspects, the system may be operative to increase a flow rate of fluid through the first fluid conduit, the sampling port, and the second fluid conduit, when the cap closes the sampling port.

In some aspects, an actuator may be provided for selectively placing the cap over the sampling port and removing the cap from over the sampling port to selectively close and open the sampling port. In some aspects, an actuator may be provided for selectively locating the sampling port over the cap and removing the sampling port from the cap to selectively close and open the sampling port. The actuator may, for instance, be a robotic arm.

In some aspects, an aperture in the cap may be provided for introducing additional fluid when the sampling port is closed. In some aspects, the aperture may be a pin-hole for introducing the additional fluid into the sampling port through the cap while maintaining a fluid seal over the sampling port when additional fluid is not introduced.

The fluid source may include a pump for introducing the fluid under pressure.

In some aspects, the second fluid conduit may include a transfer conduit for connection to a vacuum source to draw the sampling fluid and captured sample from the sampling port through the second fluid conduit to the outlet.

In some embodiments, a method is provided for operating a sampling probe that comprises a first fluid conduit having an inlet, the first fluid conduit in fluid communication with a second fluid conduit having an outlet, and a sampling port for receiving and capturing sample fluidly connecting the first fluid conduit and the second fluid conduit. The method may comprise: supplying capture fluid to the inlet; aspirating the capture fluid from the outlet; and, selectively closing and opening the sampling port to control the flow of the capture fluid through the sampling port.

In some aspects, the method may further comprise selectively placing a cap over the sampling port and removing the cap from the sampling port to selectively close and open the sampling port. In some aspects, the method may further comprise selectively locating the sampling port on the cap and removing the sampling port from cap to selectively close and open the sampling port.

In some aspects, the method may further comprise introducing additional fluid through an aperture in the cap when the sampling port is closed.

In some aspects, the method may further comprise increasing the flow rate of the capture fluid when the sampling port is closed. The flow rate may be increased, for instance, by increasing pump supply from the fluid source and/or increasing aspiration from the outlet. In some aspects, the flow rate may be increased by diverting flow through the second fluid conduit and increasing circulation of a flushing fluid when the sampling port is closed.

In some aspects, the method may further comprise switching to a second fluid when the flow rate of the capture fluid is increased.

In some aspects of the method, the capture fluid comprises methanol, and the second fluid comprises methanol with 0.1 formic acid.

In some aspects, the method may further comprise an actuator operative to move either the cap or the sampling probe to selectively open and close the sampling port.

In some embodiments a method of sampling is provided, the method comprising: providing a sampling probe including a first fluid conduit having an inlet, a second fluid conduit having an outlet, and a sampling port for receiving and capturing sample between the first fluid conduit and second fluid conduit; supplying a capture fluid at the inlet; aspirating the capture fluid at the outlet; opening the sampling port and supplying capture fluid at a first flow rate to capture samples at the sampling port; and closing the sampling port and supplying a flushing fluid at a second flow rate higher than the first flow rate for flushing the sampling probe.

In some aspects, the method may further comprise selectively locating a cap over the sampling port and separating the cap from the sampling port to selectively open and close the sampling port.

In some aspects, the method may further comprise introducing additional fluid through an aperture in the cap when the sampling port is closed.

In some aspects of the method the flushing fluid is selected from the group consisting of: a) the capture fluid; b) a flushing solvent; and, c) a combination of the capture fluid and formic acid.

In some embodiments, a removable sealing cap is provided at the inlet of the sampling probe to enable switching between "open-port probe" operation and "close-port probe" operation (e.g. for higher flow-rate flushing/sample delivery). Switching the cap between "open-port probe" operation and "close-port probe" operation allows the sampling probe and conduit to be purged at a high flow-rate for convenient solvent switching, while addressing the problem of vaper lock, and washing out residue (e.g. salts/lipids) within the conduit. Operating the sampling probe as an "open-port probe" allows for sampling at a normal low-flowrate, which can be followed by high-flow rate flushing in the "close-port probe" configuration so that analyte is delivered to the source with reduced delay when operating with a long conduit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

Figure 1:
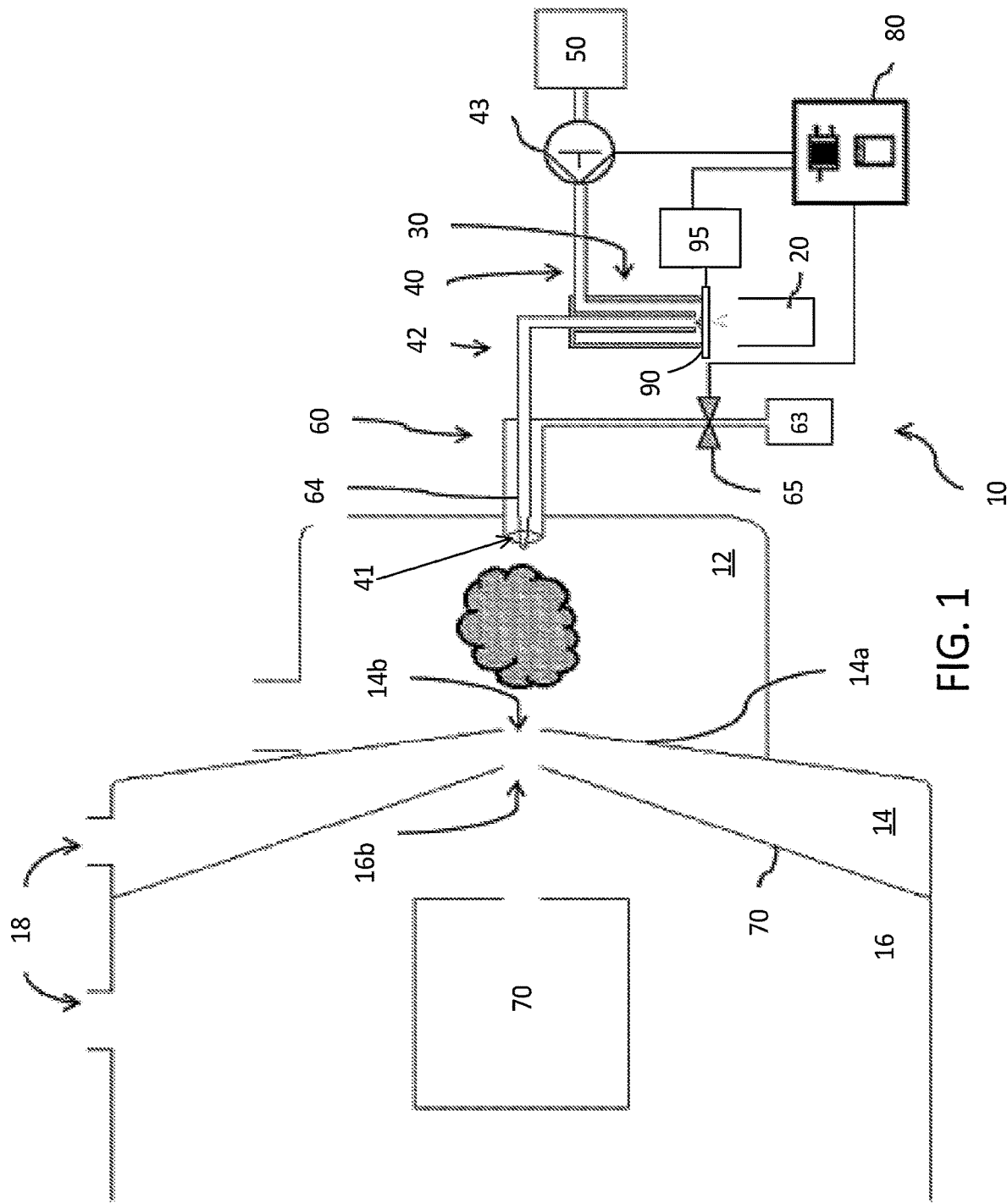
FIG. 1, in a schematic diagram, depicts an embodiment of an exemplary system in accordance with various aspects of the applicant's teachings for high flow-rate flushing and sample delivery via a sampling probe.

FIG. 1 schematically depicts an embodiment of an exemplary system 10 in accordance with various aspects of the applicant's teachings for ionizing and mass analyzing analytes from a sample 20 received within an open end of a sampling probe 30. While FIG. 1 shows the components in an exemplar orientation, it is understood that the direction of sample delivery may performed in other directions relative to gravity. As shown in FIG. 1, sampling probe 30 (e.g., an open-port sampling interface (OPI)) is in fluid communication with a nebulizer-assisted ion source 60 for discharging a liquid containing one or more sample analytes (e.g., via electrospray electrode 64) into an ionization chamber 12, and a mass analyzer 70 in fluid communication with the ionization chamber 12 for downstream processing and/or detection of ions generated by the ion source 60.

Sampling probe 30 has a first fluid conduit with an inlet connected to a pump 43 via a first fluid conduit 40 that provides for the flow of capture fluid from a reservoir 50 to the sampling probe 30. The first fluid conduit 40 in fluid communication with a second fluid conduit 42 having an outlet for conveying captured samples and capture fluid from the sampling probe 30 to the ion source 60 via a second fluid conduit 42. Sampling probe 30 further includes a sampling port fluidly connecting the first fluid conduit 40 and the second fluid conduit 42. The sampling port for receiving and capturing sample in the capture fluid flowing from the inlet of the first fluid conduit 40 to the outlet of the second fluid conduit 42. The captured samples being diluted in the second fluid conduit 42 where the capture fluid comprises a solvent.

In accordance with an aspect of Applicant's teachings, the system 10 includes a cap 90 and an actuator 95 for selectively placing the cap over the sampling port and removing the cap from over the sampling port to selectively open and close the sampling port, as discussed below. In some embodiments, the cap 90 may be movable from a position away from the sampling port to a position over the sampling port. In some embodiments, the sampling probe 30 may be movable from a position away from the cap to a position contacting the sampling port with the cap.

The pump 43 and transfer conduits 40 and 42 provide for the flow of capture fluid from reservoir 50 to the sampling probe 30 and from the sampling probe 30 to the ion source 60. For example, as shown in FIG. 1, the reservoir 50 of capture fluid (e.g., containing a fluid, such as a desorption solvent (e.g. methanol)) can be fluidly coupled to the sampling probe 30 via transfer conduit 40 which the liquid can be delivered at a selected volumetric rate by the pump 43 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting examples. As discussed in detail below, flow of fluid into and out of the sampling probe 30 occurs within a sample space accessible at the open end, i.e. the sampling port, such that one or more analytes can be introduced into the fluid within the sample space and subsequently delivered to the ion source 60. In embodiments wherein the capture fluid comprises a solvent, the sample captured at the sampling port may further be diluted during transfer such that diluted sample and capture fluid is delivered to the ion source 60.

It will be appreciated that the controller 80 can be implemented in a variety of manners in accordance with the present teachings, but generally comprises one or more processors configured to generate control signals for controlling the operations of the elements of the system 10 as otherwise discussed herein. By way of non-limiting example, the controller 80 can be in the form of a digital controller configured to control movement of the actuator 95 to move the cap 90 between "open-port probe" operation and "close-port probe" operation, as well as optionally controlling operation of the pump 43 and/or the nebulizer gas source 63 to vary the rate of flow through transfer conduits 40 and 42. In accordance with certain aspects of the present teachings, the controller can comprise a digital processor executing one or more sequences of instructions contained in memory, which may be read into memory from another computer-readable medium (e.g., a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read). Execution of the sequences of instructions contained in memory causes processor to perform the process described herein. Alternatively, hard-wired circuitry may be used in place of or in combination with software instructions to implement the present teachings. Thus, implementations of the present teachings are not limited to any specific combination of hardware circuitry and software. In various embodiments, the controller 80 can be connected to one or more other computer systems across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

With continued reference to FIG. 1, the ion source 60 can have a variety of configurations but is generally configured to generate ions from analytes contained within the capture fluid (e.g., the desorption solvent) that is received from the sampling probe 30. In the exemplary embodiment depicted in FIG. 1, an electrospray electrode 64, which can comprise a capillary that is fluidly coupled to the sampling probe 30, terminates in an outlet end that at least partially extends into the ionization chamber 12 and discharges charged desorption solvent including captured analytes therein. As will be appreciated by a person skilled in the art in light of the present teachings, the outlet end of the electrospray electrode 64 can atomize, aerosolize, nebulize, or otherwise discharge (e.g., spray with a nozzle) the desorption solvent into the ionization chamber 12 to form a sample plume comprising a plurality of micro-droplets generally directed toward (e.g., in the vicinity of) the curtain plate aperture 14b and vacuum chamber sampling orifice 16b. As is known in the art, analytes contained within the micro-droplets can be ionized (i.e., charged) by the ion source 60, for example, as the sample plume is generated. By way of non-limiting example, the outlet of the electrospray electrode 64 can be made of a conductive material and electrically coupled to a pole of a voltage source (not shown), while the other pole of the voltage source can be grounded. Micro-droplets contained within the sample plume can thus be charged by the voltage applied to the outlet end such that as the fluid or desorption solvent within the droplets evaporates during desolvation in the ionization chamber 12 such bare charged analyte ions are released and drawn toward and through the apertures 14b, 16b and focused (e.g., via one or more ion lens) into the mass analyzer 70. Though the ion source probe is generally described herein as an electrospray electrode 64, it should be appreciated that any number of different ionization techniques known in the art for ionizing liquid samples and modified in accordance with the present teachings can be utilized as the ion source 60. By way of non-limiting example, the ion source 60 can be an electrospray ionization device, a nebulizer assisted electrospray device, a chemical ionization device, a nebulizer assisted atomization device, a photoionization device, a laser ionization device, a thermospray ionization device, or a sonic spray ionization device.

As shown in FIG. 1, the exemplary ion source 60 can optionally include a source 63 of pressurized gas (e.g. nitrogen, air, or noble gas) that supplies a high velocity nebulizing gas flow which surrounds the outlet end of the electrospray electrode 64 and interacts with the liquid discharged therefrom to enhance the formation of the sample plume and the ion release within the plume for sampling by 14b and 16b, e.g., via the interaction of the high speed nebulizing flow and jet of liquid sample. The nebulizer gas can be supplied at a variety of flow rates, for example, in a range from about 0.1 L/min to about 20 L/min, which can also be controlled under the influence of controller 80 (e.g., via opening and/or closing valve 65). In accordance with various aspects of the present teachings, it will be appreciated that the flow rate of the nebulizer gas can be adjusted (e.g., under the influence of controller 80) such that the flow rate of fluid within the sampling probe 30 can be adjusted based, for example, by a suction/aspiration force generated by the interaction of the nebulizer gas and the desorption solvent as it is being discharged from the electrospray electrode 64 (e.g., due to the Venturi effect). In this manner, the controller 80 can additionally or alternatively control the flow rate of the capture fluid within the sampling probe 30 by adjusting one or more of a pump and/or valve 65 for controlling the pressure or flow rate of the nebulizer gas. By way of non-limiting example, the controller 80 can be configured to maintain the flow rate of fluid supplied by the pump 43 to the inlet of a first fluid conduit of the sampling probe 30, i.e. a supply conduit, as substantially constant, while accounting for changes in experimental conditions (e.g., temperature effects, instability of the pump 43, changes of solvent/sample composition, for example, resulting in changes in solvent/sample viscosity, introduction rate/volume of liquid samples into the sample space) by adjusting the flow of nebulizer gas provided from the nebulizer source 63 to thereby adjust the flow of fluid from the sampling port of the sampling probe 30 to the outlet of a second fluid conduit of the sampling probe 30, i.e. an exhaust conduit.

In the depicted embodiment, the ionization chamber 12 can be maintained at an atmospheric pressure, though in some embodiments, the ionization chamber 12 can be evacuated to a pressure lower than atmospheric pressure. The ionization chamber 12, within which analytes desorbed from the sample 20 can be ionized as the desorption solvent is discharged from the electrospray electrode 64, is separated from a gas curtain chamber 14 by a plate 14a having a curtain plate aperture 14b. As shown, a vacuum chamber 16, which houses the mass analyzer 70, is separated from the curtain chamber 14 by a plate 16a having a vacuum chamber sampling orifice 16b. The curtain chamber 14 and vacuum chamber 16 can be maintained at a selected pressure(s) (e.g., the same or different sub-atmospheric pressures, a pressure lower than the ionization chamber) by evacuation through one or more vacuum pump ports 18.

It will also be appreciated by a person skilled in the art and in light of the teachings herein that the mass analyzer 70 can have a variety of configurations. Generally, the mass analyzer 70 is configured to process (e.g., filter, sort, dissociate, detect, etc.) sample ions generated by the ion source 60. By way of non-limiting example, the mass analyzer 70 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-Q linear ion trap (Q TRAP®) mass spectrometer," authored by James W. Hager and J. C. Yves LeBlanc and published in *Rapid Communications in Mass Spectrometry* (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance, other suitable mass spectrometers may include single quadrupole, triple quadrupole, ToF, trap, and hybrid analyzers. It will further be appreciated that any number of additional elements can be included in the system 10 including, for example, an ion mobility spectrometer (e.g., a differential mobility spectrometer) that is disposed between the ionization chamber 12 and the mass analyzer 70 and is configured to separate ions based on their mobility through a drift gas in high- and low-fields rather than their mass-to-charge ratio). Additionally, it will be appreciated that the mass analyzer 70 may comprise a sensor that can detect the ions which pass through the analyzer 70 and may, for example, supply a signal indicative of the number of ions per second that are detected.

Figures 2A, 2B:
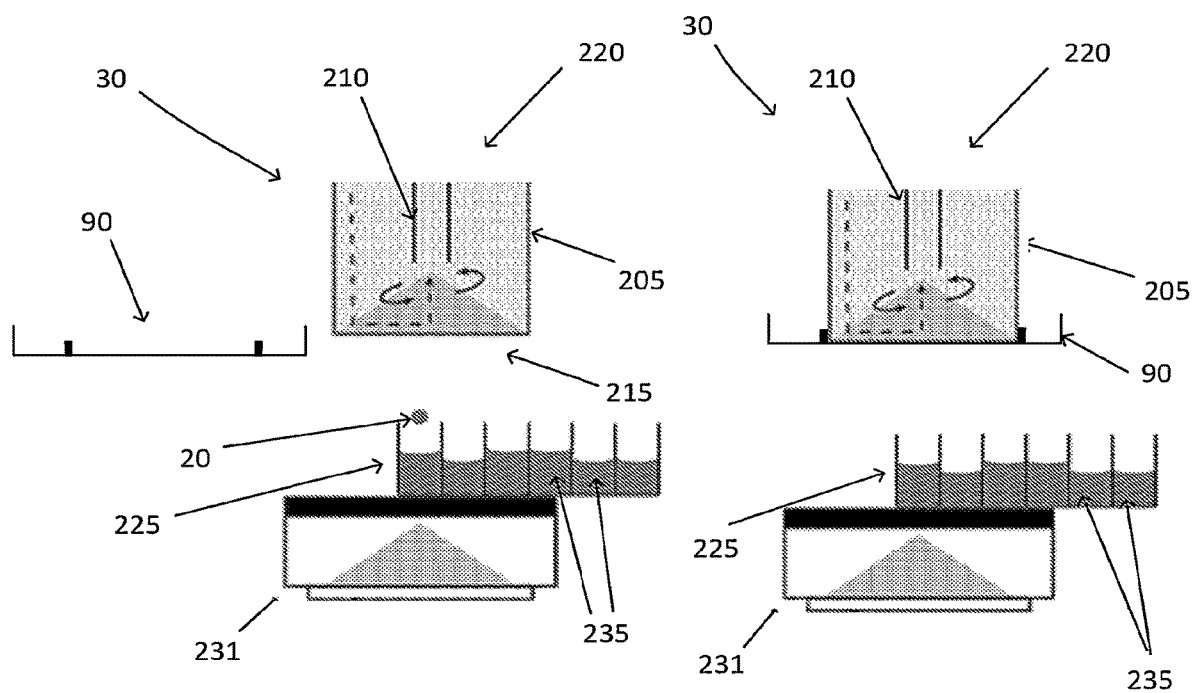
FIGS. 2A and 2B are schematic representations of a sampling probe for using the exemplary system of FIG. 1, with a cap used in embodiments for selectively opening (FIG. 2A) and closing (FIG. 2B) the sampling port.

The sampling probe 30 can have a variety of configurations but generally includes an open end by which capture fluid delivered from the reservoir 50 is open to the atmosphere at a sampling port 215 of the sampling probe 30, thus exhibiting a liquid-air interface, as shown schematically in FIG. 2A. The sampling probe 30 can include a first fluid conduit 205, in the form of a first cylindrical member, and a second fluid conduit 210, in the form of a second cylindrical member disposed within the first cylindrical member and arranged in a co-axial arrangement. An open-ended tip, sampling port 215, is located between and fluidly connecting the first fluid conduit 205 and the second fluid conduit 210 is located to expose a liquid surface of capture fluid flowing from the first fluid conduit 205 to the second fluid conduit 210 and configured to receive molecules 20 of a sample containing or suspected of containing one or more analytes for capture in the flowing capture fluid.

In operation, samples 20 may be ejected from a sample vessel 225, acoustically, pneumatically, etc., into the sampling port 215 of sampling probe 30. Within the sampling probe 30, capture fluid (e.g. organic solvent) travels through a first fluid conduit 205, i.e. a supply conduit, toward the sampling port 215 through the annular space 220 between the two cylindrical members, captures sample ejected from the sample vessel 225, and then travels away from the sampling port 215 through the inner cylinder, a second fluid conduit 210, as depicted in the dashed lines in FIGS. 2A and 2B defining the fluid path from the first fluid conduit 205, through the sampling port 215, to the second fluid conduit 210. The capture fluid and molecules of diluted sample 20 flow from the sampling port 215 to the ionization chamber 12, as discussed above.

By way of non-limiting example, in some embodiments the sample 20 may comprise a liquid sample that can be ejected from sample vessel 310, acoustically, pneumatically, etc. directly into the fluid present within the sample space at the tip end 215. It will likewise be appreciated by those skilled in the art, in light of the teachings herein that any capture fluid (e.g., solvent) suitable for directly receiving a liquid sample, for example, and amenable to the ionization process can be provided by the reservoir 50 in accordance with various aspects of the present teachings. In other embodiments, the sample may comprise a solid sample that may be introduced directly into the capture fluid present within the sample space for dissolution. In some embodiments, the solid sample can comprise solid phase substrates having binding affinity for a selected protein of a drug molecules, such as Solid Phase MicroExtraction (SPME) fibers or magnetic particles.

Figure 3:
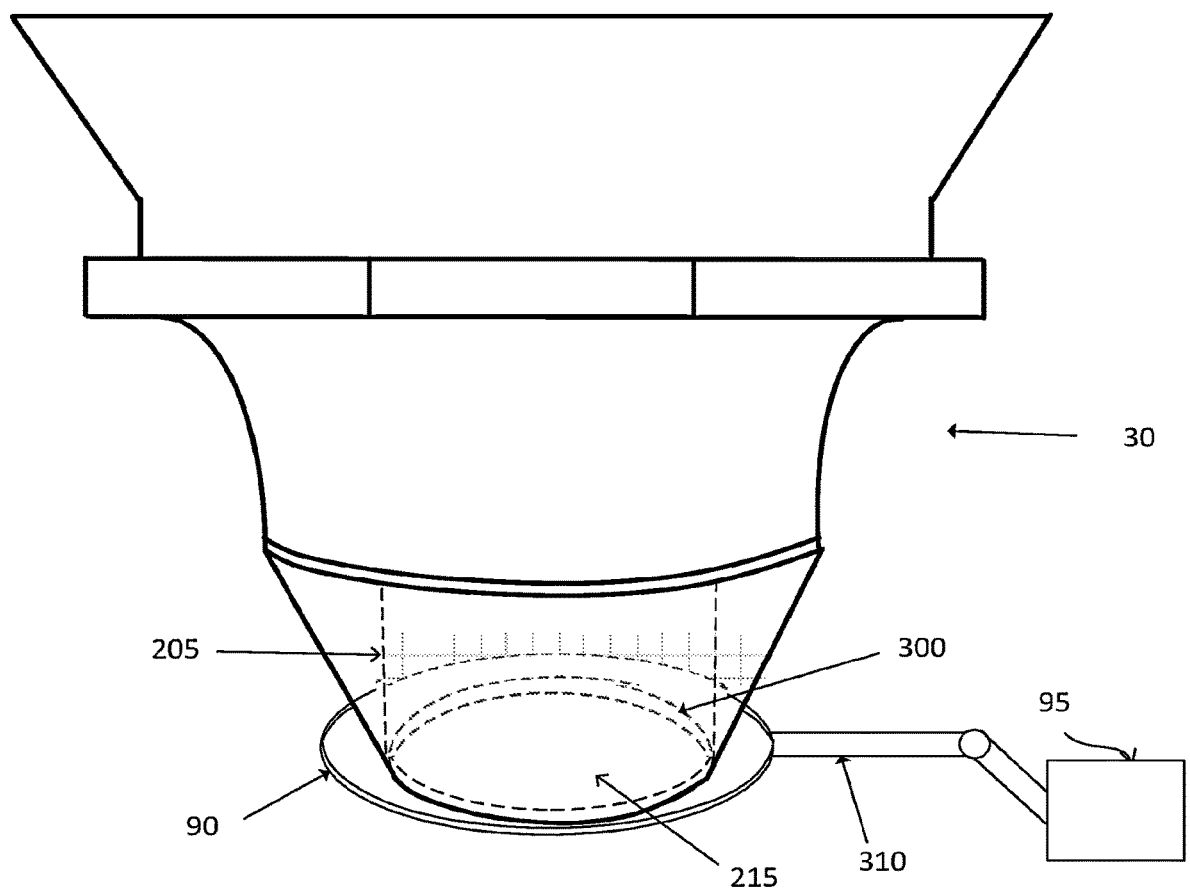
FIG. 3 shows details of the cap depicted in FIGS. 2A and 2B.

Turning to FIG. 3, in the closed position (also shown in FIG. 2A), the cap 90 selectively seals the sampling port 215 of sampling probe 30 for enabling higher flow-rate flushing/sample delivery, as discussed below. In an embodiment, the cap 90 includes an O-ring 300 for creating an airtight seal around the open-ended tip 215. Actuator 95, under control of the controller 80, selectively positions the cap 90 over the sampling port 215 in sealing engagement and removing the cap 90 from the sampling port for switching between open-port operation of the sampling probe 30 (FIG. 2A) to receive sample 20, and closed-port operation (FIGS. 2A and 3) for clearing solid residues and bubbles from the transfer conduit, when switching between modifier gas sources, and/or higher flow-rate sample delivery. In some embodiments, the actuator 95 may be operative to selectively locate the sampling port of the sampling probe 30 in sealing engagement with the cap 90 and to remove the sampling port from the cap 90 to selectively close and open the sampling port.

In the embodiment of FIG. 3, actuator 95 operates a robotic arm 310 for switching the cap 90 between the open and closed positions. In this embodiment the actuator 95 moves the cap between the open and closed positions. In other embodiments, the actuator 95 may be operative to move the sampling probe 30 between the open and closed positions. In some embodiments, the cap 90 may be discarded after use (e.g. consumable plastic). Thus, robotic arm 310 can be programmed to initially to position the cap 90 in the open port position and then, after a flushing cycle with the cap 90 positioned in the closed port position, robotic arm 310 can discard the cap 90 and retrieve a new cap (e.g. from a stack of caps 90).

Figure 4:
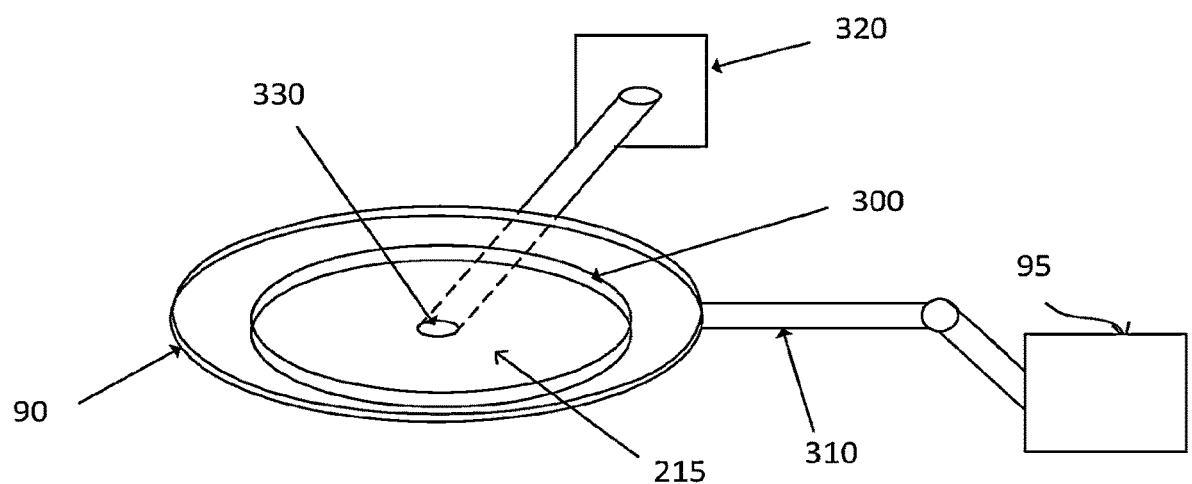
FIG. 4 shows details of a further embodiment of the cap depicted in FIGS. 2A and 2B.

In another embodiment shown in FIG. 4, a further pump 320 is provided in addition to, or as an alternative to the main pump 43, for delivering an additional fluid (e.g. irrigation or cleaning solution) directly through an aperture 330 (e.g. pin hole) in the cap 90. The additional fluid may be introduced, for instance, by inserting a probe or needle through the aperture 330 and injecting the additional fluid into the sampling port.

Figure 5:
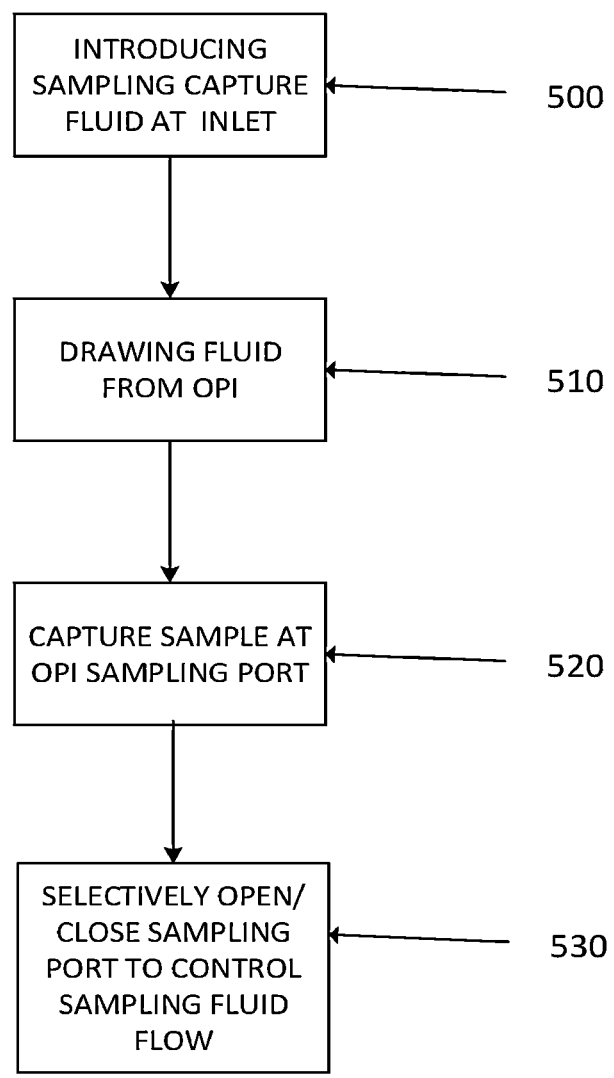
FIG. 5 depicts a method for high flow-rate flushing and sample delivery via the sampling probe of FIGS. 2-4, according to an embodiment.

In another aspect, as set forth in FIG. 5, a method of sampling is shown using the sampling probe 30. At 500 a capture fluid source is provided to supply capture fluid to the inlet to flow through the first fluid supply conduit to the sampling port (open-ended tip 215) of the sampling probe 30. At 510, an aspirator is provided in fluid communication with the outlet 41 of the second fluid exhaust conduit to draw capture fluid from the sampling port of the sampling probe 30. At 520, capture fluid flows from the fluid source and past the sampling port to capture samples in the capture fluid at the sampling port. At 530, the cap 90 selectively opens and closes the sampling port to control access to the sampling port and to control the flow of the capture fluid through the sampling probe 30 from inlet to outlet. In some embodiments, the cap 90 may close the sampling port to retain capture fluid when reducing or shutting off the aspirator. In some embodiments, the cap 90 may close the sampling port to provide a continuous closed fluid pathway when flushing the sampling probe 30. In some aspects, a flow rate of fluid through the sampling probe 30 may be increased from a lower capture flow rate to a relatively higher flushing flow rate when the sampling port is closed by the cap 90.

Applications of the method of FIG. 5 include purging the first fluid conduit 40, second fluid conduit 42 and electrode 64 at a high flow-rate with a flushing fluid while cap 90 is in the closed port position. The flushing fluid may comprise a same solution as the capture fluid, or conveniently may comprise a different solution tailored for dissolving and/or flushing away contaminants. The different solution may comprise a flushing solvent comprising a different solvent composition from the capture fluid. In some aspects, the flushing solvent may comprise water, In some aspects, the flushing solvent may comprise methanol. In some aspects, the flushing fluid may comprise a combination of methanol and formic acid. In embodiments where a different solution of flushing fluid is employed, fluid switching (e.g. changing from methanol to methanol with 0.1 formic acid) may be employed within a continuous closed fluid pathway to eliminate vapor lock or leakage and/or to accommodate higher flow rates to wash away contaminants adhered to the surfaces such as salts/lipids, etc. In some embodiments, the fluid switching may comprise a valve operative to switch from a capture fluid supply to a flushing fluid supply input to the first fluid conduit. In some embodiments, the fluid switching may comprise injecting a flushing compound, such as formic acid, into the supply of capture fluid input to the first fluid conduit. In some embodiments the switching may further comprise re-directing or diverting the outflow from the second fluid conduit from the outlet to a waste receptacle. In these embodiments, the fluid switching may include coordination of introducing the flushing fluid and re-directing the outflow to flush the sampling probe and divert the outflow from the ion source to waste receptacle for collection of the flushing fluid and any flushed waste. In other aspects, the flushing fluid may outflow through the ion source without diversion.

Figure 6:
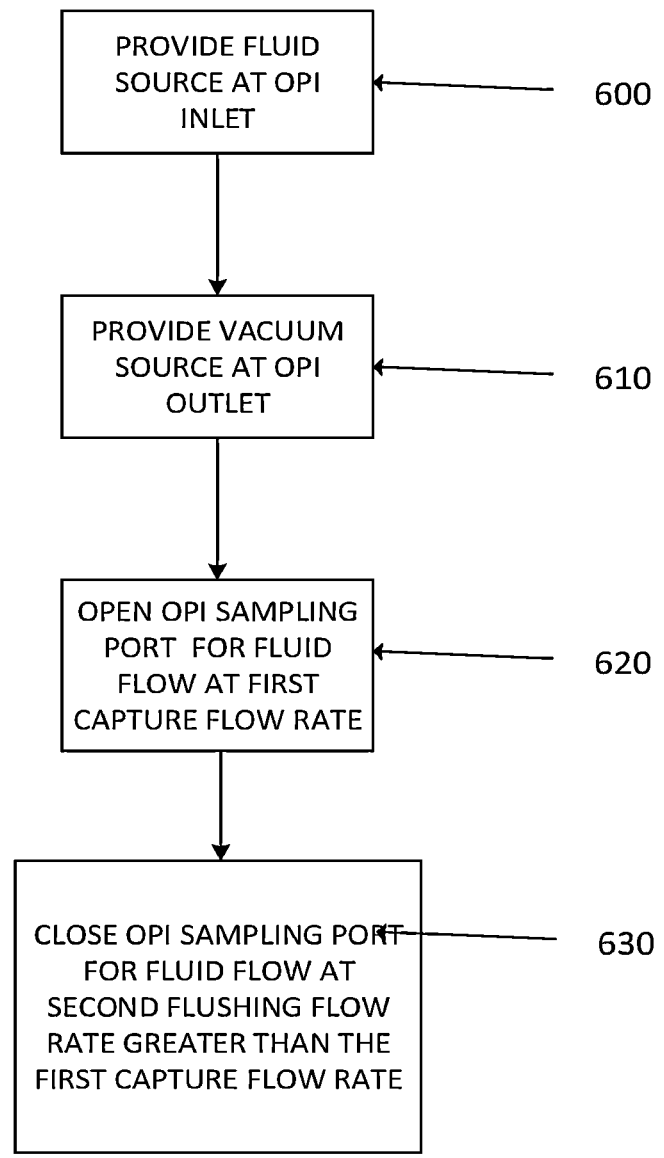
FIG. 6 depicts a method for high flow-rate flushing and sample delivery via the sampling probe of FIGS. 2-4, according to another embodiment.

In further aspect, as set forth in FIG. 6, a method of sampling is shown using the sampling probe 30. At 600 a capture fluid source is provided to supply capture fluid to the inlet to flow through the first fluid supply conduit to the sampling port (open-ended tip 215) of the sampling probe 30. At 610, an aspirator is provided at the outlet 41 of the sampling probe 30. At 620, the cap 90 is positioned (i.e. under control of actuator 95) to an open port position for capturing samples at the inlet 215 at a first flow rate. Then, at 630, the cap 90 is positioned to a closed port position for flowing the samples from the inlet 215 to the outlet 41 at a second flow rate greater than the first flow rate for high-flow rate flushing so that the samples is delivered to the source 60 within a much shorter time than at the first flow rate. This is advantageous where the first fluid conduit 40 and second fluid conduit 42 are long transfer and/or when the solvent is aqueous.

While particular embodiments have been illustrated and described, it would be apparent to those skilled in the art that various other changes and modifications can be made and are intended to fall within the scope of the present disclosure. Furthermore, although the present disclosure has been described herein in the context of particular implementations in particular environments for particular purposes, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A sampling system, comprising:
 a sampling probe comprising:
  a first fluid conduit having an inlet, the first fluid conduit in fluid communication with a second fluid conduit having an outlet, and a sampling port for receiving and capturing sample fluidly connecting the first fluid conduit and the second fluid conduit;
  a fluid source for supplying capture fluid attached to the inlet; and,
  a cap for selectively closing the sampling port and opening the sampling port to receive a sample.

2. The sampling system of claim 1, further comprising an actuator for selectively placing the cap over the sampling port and removing the cap from over the sampling port to selectively close and open the sampling port.

3. The sampling system of claim 1, further comprising an actuator for selectively locating the sampling port over the cap and removing the sampling port from the cap to selectively close and open the sampling port.

4. The sampling system of claim 2, wherein the actuator is a robotic arm.

5. The sampling system of claim 1, further comprising an aperture in the cap for introducing additional fluid when the sampling port is closed.

6. The sampling system of claim 5, wherein the aperture is a pin-hole for introducing the additional fluid.

7. The sampling system of claim 1, wherein the fluid source includes a pump for introducing the fluid under pressure at a first flow rate.

8. A method of operating a sampling probe that comprises a first fluid conduit having an inlet, the first fluid conduit in fluid communication with a second fluid conduit having an outlet, and a sampling port for receiving and capturing sample fluidily fluidly connecting the first fluid conduit and the second fluid conduit, the method comprising:
supplying capture fluid to the inlet;
aspirating the capture fluid from the outlet; and,
controlling the flow of the capture fluid through the sampling port using a cap to selectively close the sampling port and open the sampling port to receive a sample.

9. The method of claim 8, further comprising selectively placing a cap over the sampling port and removing the cap from the sampling port to selectively close and open the sampling port.

10. The method of claim 8, further comprising selectively locating the sampling port on the cap and removing the sampling port from cap to selectively close and open the sampling port.

11. The method of claim 8, further comprising introducing additional fluid through an aperture in the cap when the sampling port is closed.

12. The method of claim 8, further comprising increasing the flow rate of the capture fluid when the sampling port is closed.

13. The method of claim 8, further comprising switching to a second fluid when the flow rate of the capture fluid is increased.

14. The method of claim 13, wherein the capture fluid comprises methanol, and the second fluid comprises methanol with 0.1 formic acid.

15. The method of claim 8, further comprising an actuator operative to move either the cap or the sampling probe to selectively open and close the sampling port.

16. A method of sampling, comprising:
providing a sampling probe including a first fluid conduit having an inlet, a second fluid conduit having an outlet, and a sampling port for receiving and capturing sample between the first fluid conduit and second fluid conduit;
supplying a capture fluid at the inlet;
aspirating the capture fluid at the outlet;
opening the sampling port and supplying capture fluid at a first flow rate to capture samples at the sampling port; and
closing the sampling port and supplying a flushing fluid at a second flow rate higher than the first flow rate for flushing the sampling probe.

17. The method of claim 16, further comprising selectively locating a cap over the sampling port and separating the cap from the sampling port to selectively open and close the sampling port.

18. The method of claim 16, further comprising introducing additional fluid through an aperture in the cap when the sampling port is closed.

19. The method of claim 16, wherein the flushing fluid is selected from the group consisting of:
a) the capture fluid;
b) a flushing solvent; and,
c) a combination of the capture fluid and formic acid.

20. The method of claim 8, further comprising selectively closing the sampling port, using the cap, to flush the sampling probe.

* * * * *